US010661895B2

(12) United States Patent
Alonso

(10) Patent No.: US 10,661,895 B2
(45) Date of Patent: May 26, 2020

(54) BOX KITE AND METHOD OF CONSTRUCTION

(71) Applicant: Francis A. Alonso, Santa Monica, CA (US)

(72) Inventor: Francis A. Alonso, Santa Monica, CA (US)

(*) Notice: Subject to any disclaimer, the term of this patent is extended or adjusted under 35 U.S.C. 154(b) by 402 days.

(21) Appl. No.: 15/843,665

(22) Filed: Dec. 15, 2017

(65) Prior Publication Data

US 2019/0185156 A1 Jun. 20, 2019

(51) Int. Cl.
*B64C 31/06* (2020.01)
*D05B 23/00* (2006.01)

(52) U.S. Cl.
CPC .............. *B64C 31/06* (2013.01); *D05B 23/00* (2013.01)

(58) Field of Classification Search
CPC ...................................................... B64C 31/06
See application file for complete search history.

(56) References Cited

U.S. PATENT DOCUMENTS

| 607,129 | A | * | 7/1898 | Potter .................... A63H 27/08 244/153 R |
|---|---|---|---|---|
| 770,626 | A | | 9/1904 | Bell |
| 1,223,163 | A | | 4/1917 | Graham |
| 1,328,143 | A | | 1/1920 | Fergusson et al. |
| 1,666,813 | A | | 4/1928 | Eddy |
| 2,386,762 | A | | 10/1945 | Wheelwright |
| 2,533,570 | A | | 12/1950 | Foy |
| 2,744,701 | A | | 5/1956 | Robey |
| 2,873,077 | A | * | 2/1959 | Corbin .................... A63H 27/08 244/153 R |
| 2,988,309 | A | | 6/1961 | Pohl et al. |
| 3,039,722 | A | | 6/1962 | Eustis |
| 3,098,634 | A | * | 7/1963 | Finklea .................. A63H 27/08 244/153 R |

(Continued)

FOREIGN PATENT DOCUMENTS

JP H0531259 A 9/1993

*Primary Examiner* — Richard G Davis
(74) *Attorney, Agent, or Firm* — Steinfl + Bruno LLP

(57) ABSTRACT

A single tow point box kite is presented that includes a single piece fabric canopy having a pair of sails connected via sleeves. The pair of sails are maintained in a drum-tight fashion to form a quadrangular configuration via a demountable frame that includes a plurality of spars projecting between the sails and through respective sleeves, with respective opposite extremities of the spars received in respective pockets of the fabric canopy, and struts projecting between pairs of spars. Sides of the quadrangular configuration are thus joined at corners defined by interaction of each of the plurality of spars of the demountable frame with respective pockets and sleeves of the canopy.

Also presented is a method for making the box kite canopy, including selecting first and second sails, defining lines of respective corners of the sails, forming fabric pockets along the lines of the respective corners at edge regions of the respective sails, making fabric loops, connecting the fabric loops to the respective sails along the lines of the respective corners at edge regions of the respective sails opposite the pockets, forming fabric sleeves to extend between the sails and sized to receive respective spars, and connecting the fabric sleeves to the sleeves via respective fabric loops.

22 Claims, 15 Drawing Sheets

(56) References Cited

U.S. PATENT DOCUMENTS

| | | | |
|---|---|---|---|
| 3,161,386 A | 12/1964 | Umanoff | |
| 3,327,975 A | 6/1967 | Vaughan | |
| 3,468,503 A | 9/1969 | Snibbe | |
| 3,494,578 A | 2/1970 | Cureton | |
| 3,740,008 A | 6/1973 | Grauel | |
| 3,893,641 A | 7/1975 | Sutton | |
| 3,937,426 A | 2/1976 | Pearce | |
| 3,948,471 A | 4/1976 | Pearce et al. | |
| 3,951,363 A | 4/1976 | Grauel | |
| 4,076,189 A | 2/1978 | Powell | |
| 4,159,087 A | 6/1979 | Moomaw | |
| 4,201,357 A * | 5/1980 | Gambardella | A63H 27/08 244/153 R |
| 4,715,564 A | 12/1987 | Kinn et al. | |
| 4,807,832 A | 2/1989 | Tabor | |
| 4,813,637 A | 3/1989 | Bondestam | |
| 4,815,681 A | 3/1989 | Crowell | |
| 4,830,313 A | 5/1989 | Cheng | |
| 4,848,704 A | 7/1989 | Sams | |
| 5,152,481 A | 10/1992 | Cote et al. | |
| 5,328,134 A | 7/1994 | Powers | |
| 5,492,288 A | 2/1996 | Bordelon | |
| 5,727,756 A * | 3/1998 | Rowe | A63H 27/08 244/153 R |
| 5,811,728 A | 9/1998 | Maeda | |
| 5,833,174 A | 11/1998 | Knight et al. | |
| 6,135,388 A | 10/2000 | Hostetter | |
| 6,598,833 B2 | 6/2003 | Tabor | |
| 6,663,050 B2 | 12/2003 | Tabor | |
| 6,837,463 B2 | 1/2005 | Lynn | |
| 6,854,690 B2 | 2/2005 | Tabor | |
| D502,745 S | 3/2005 | Tabor et al. | |
| 6,955,325 B1 | 10/2005 | Tabor et al. | |
| 7,621,484 B2 | 11/2009 | Wingert | |
| 2007/0120017 A1* | 5/2007 | Webb | G03B 37/00 244/153 R |

* cited by examiner

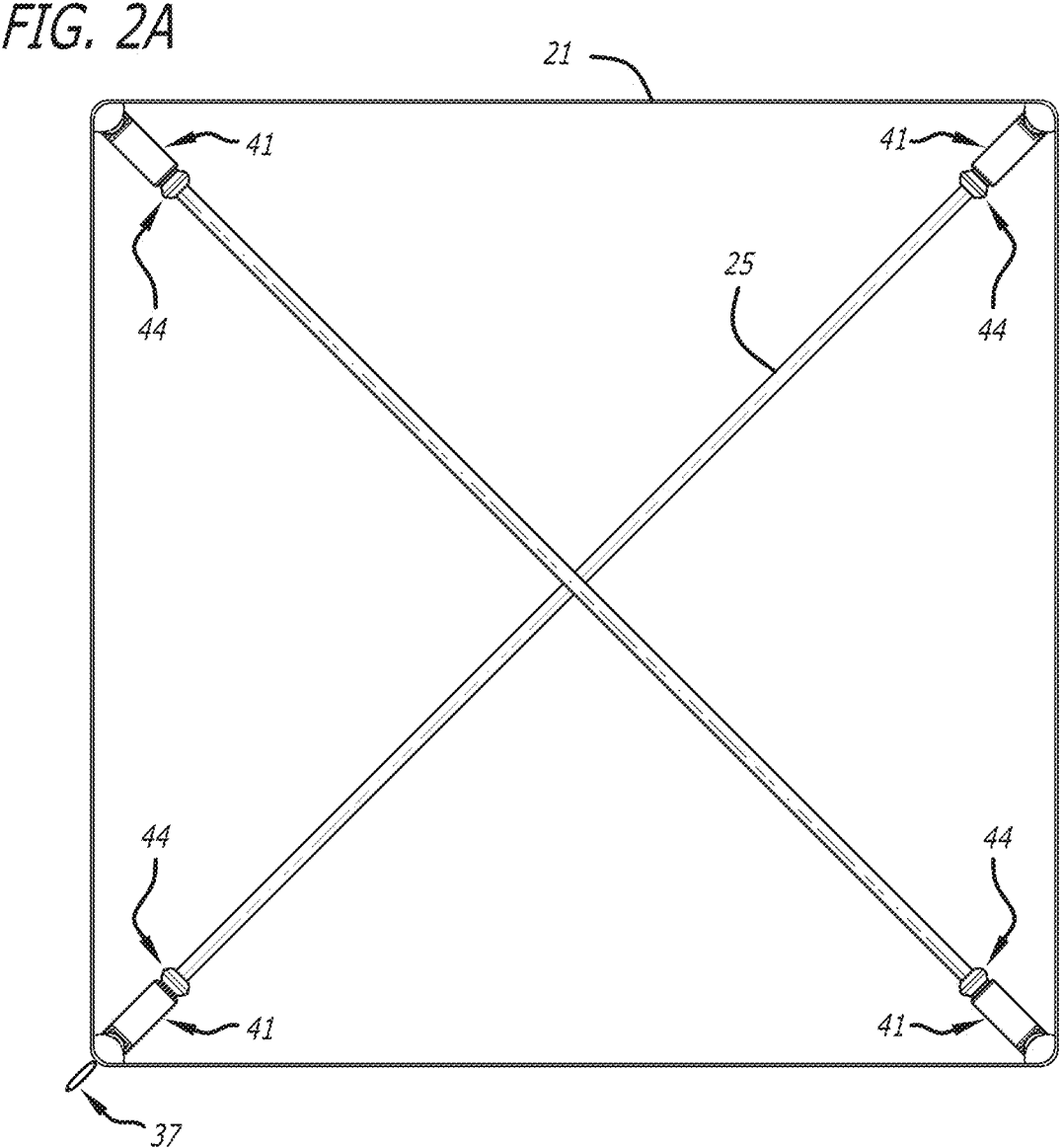

FIG. 2B
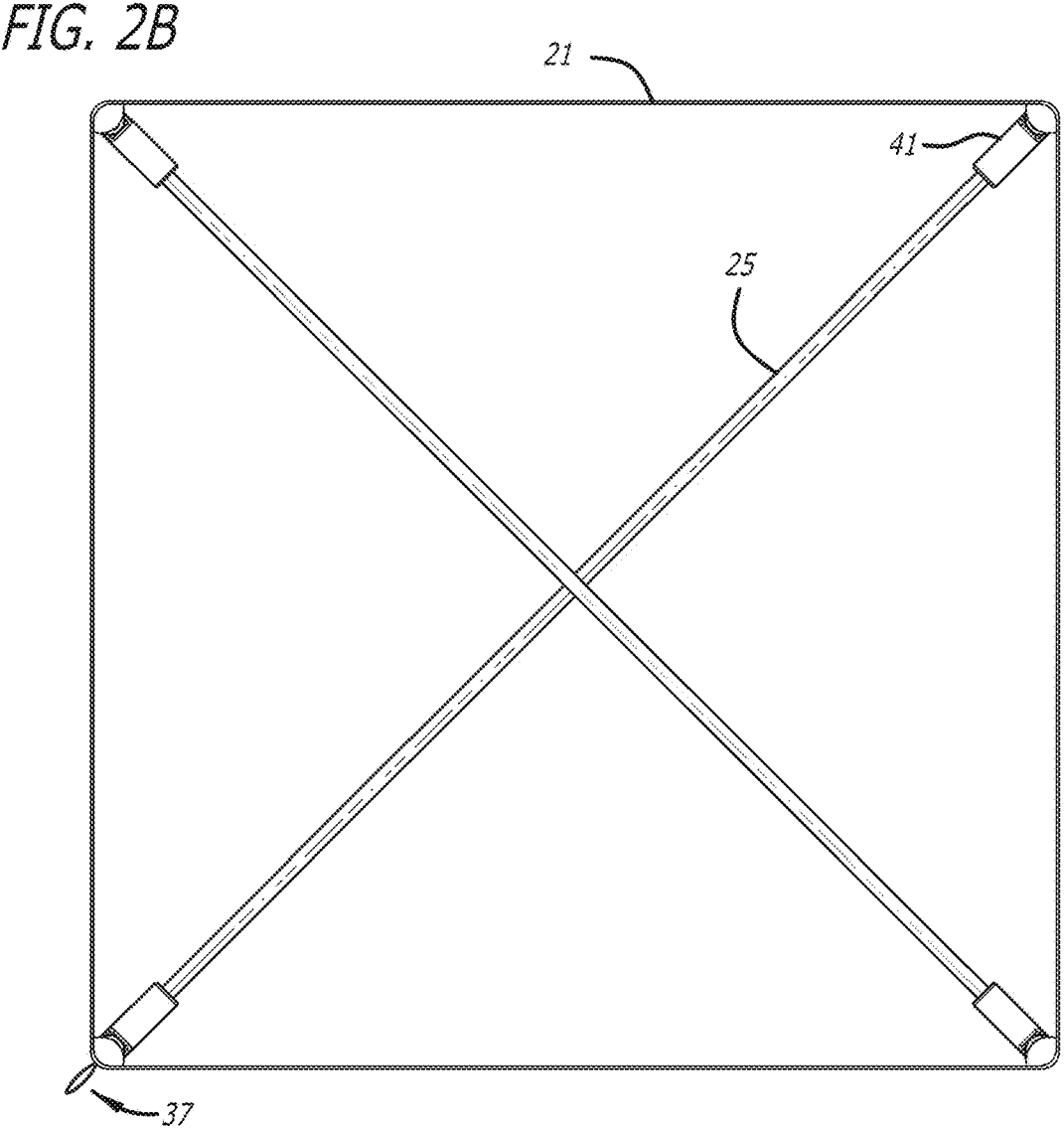
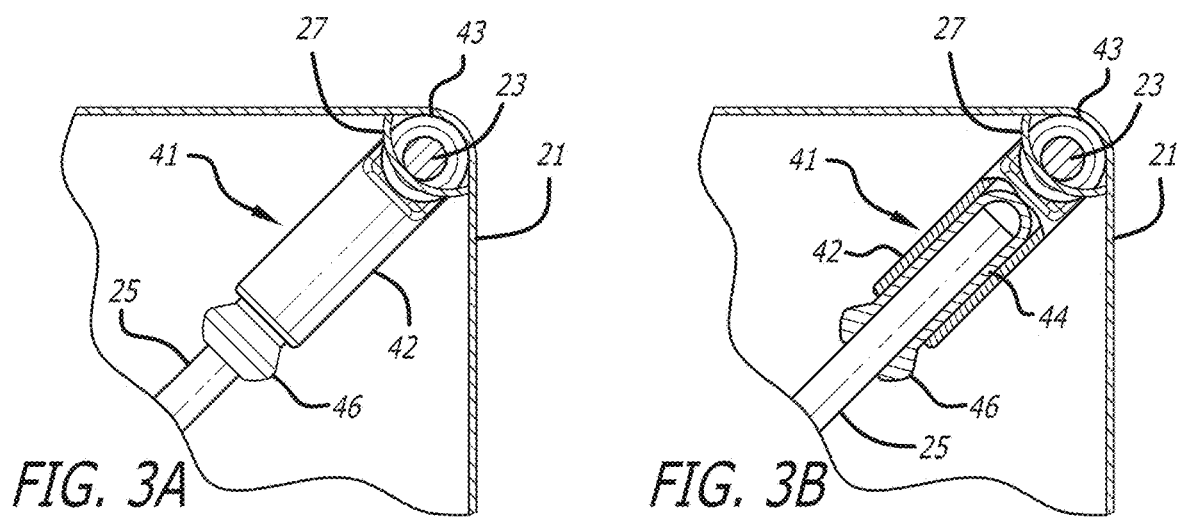
FIG. 3A
FIG. 3B

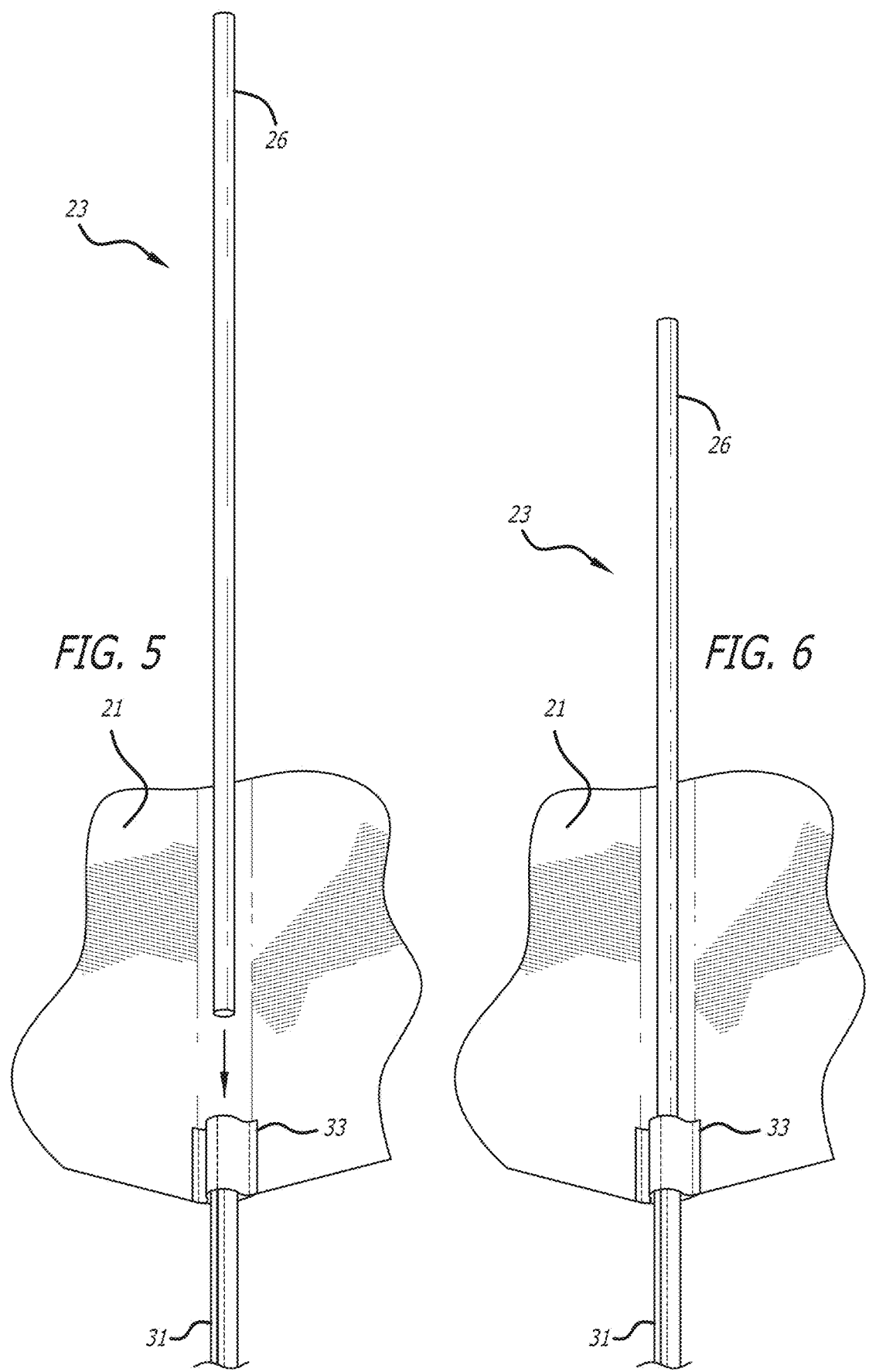

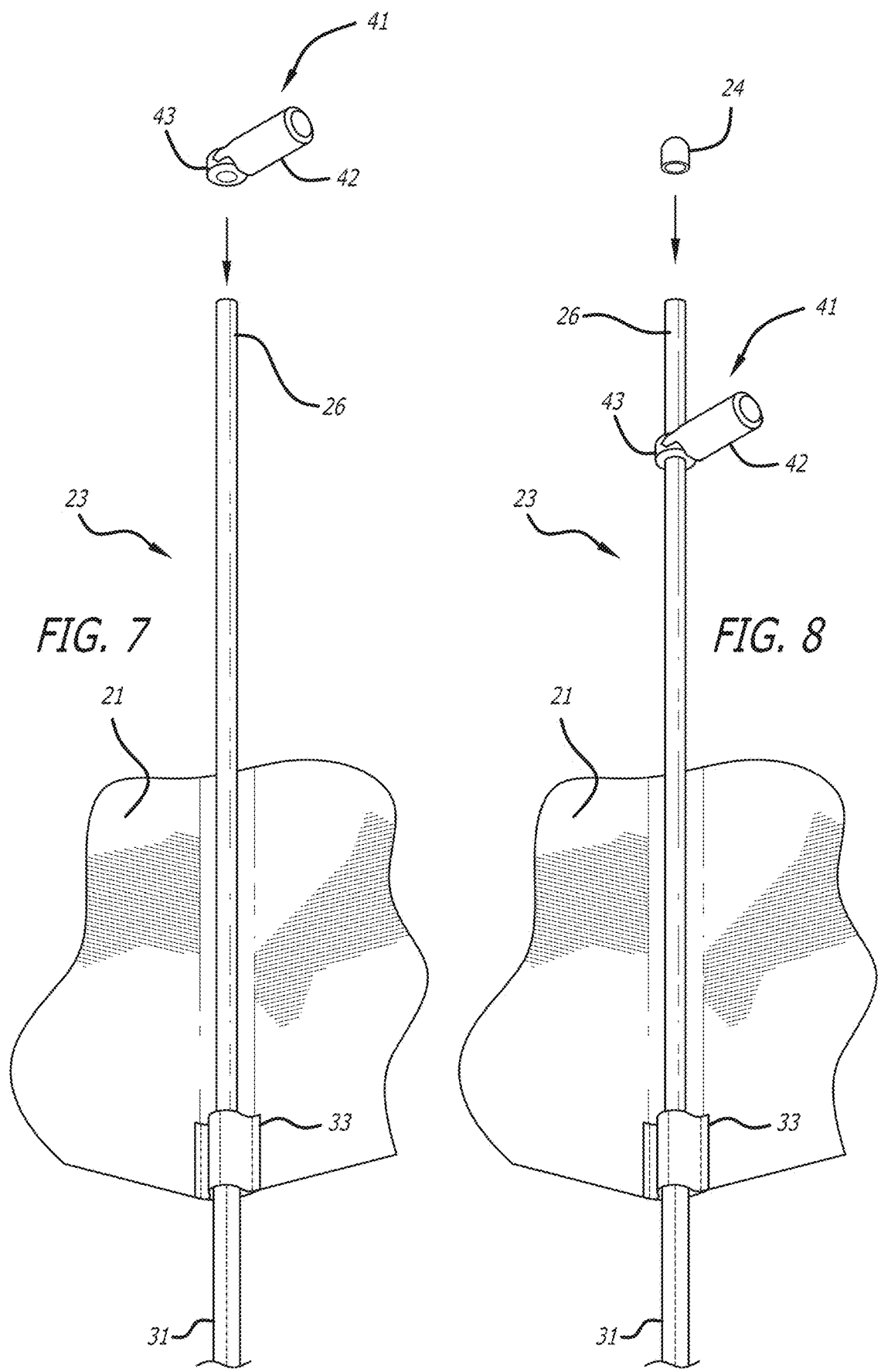

BOX KITE AND METHOD OF CONSTRUCTION

CROSS REFERENCE TO RELATED APPLICATIONS

The present application may be related to U.S. Design application Ser. No. 29/628,160 for a "Box Kite Eye Socket and Plug Combination" filed on Dec. 1, 2017 and U.S. Design application Ser. No. 29/628,168 for a "Kite Packaging Cap" filed on Dec. 1, 2017, both of which are incorporated herein by reference in their entirety.

TECHNICAL FIELD

The present invention relates generally to box or cell kites.

BACKGROUND

Box and cell kites have been known for many years in various different configurations. Box kites are thought of as having rectangular sails at the opposite ends of three or four spars. Cell kites are thought of as hollow cells stacked next to each other with or without flat sides, sometimes imitating traditional square flat sided box kites.

Lawrence Hargrave has been accepted in some annals as the inventor of the original box kite. That construction featured long, straight spars running longitudinally the full length of the kite with diagonal spreader braces at the opposite ends which serve to maintain the entire structure spread apart in a rigid manner with flat cloth sails distended in a quadrangle, typically in a square shape giving it the traditional "box" appearance. Box kites incorporate quadrangle sails which may be in the shape of a trapezoid, parallelogram, rhombus, or the traditional rectangular or square shape, but designs have also incorporated three spars and triangular box-like sails.

Many efforts have been made to improve on the construction of box kites, the efficiency and ease of manufacture, assembly, and performance thereof. Some focus has been on the connectors between the diagonal struts within the box sails and the longitudinal spars. An example of an early such connector is shown in U.S. Pat. No. 607,129 to Potter, whose disclosure is incorporated herein by reference in its entirety. This patent shows a metal fining formed on one end with a square ring, defining a square, opening in one direction and a square stub tube projecting perpendicular thereto.

Work on unrelated platforms such as aircraft-shaped kites has led to projection of spars or struts extending in multiple different axes and at different angles to one another. V-shaped connectors have been purposed with a pair of tubular elements in one plane and a stub tube projecting in a different plane. Devices of this type are shown in U.S. Pat. Nos. 6,598,833 and 6,663,050 to Tabor, Whose disclosures are incorporated herein by reference in their entirety. Such devices, while striving for improved performance in the particular construction, fail to provide for a convenient, reliable, and effective spar and strut connection.

SUMMARY

Box kites have long had the potential for popularity as heavier-than-air flying platforms, but until now have not achieved their potential due to their bulk and complexity of assembly and disassembly. It is important that the kites be relatively light-weight to thus fly in minimal breezes and to also have structural integrity, all the while, being relatively inexpensive to manufacture, straight-forward and safe to: a) assemble while providing optimal flying performance, and b) disassemble for packaging into a small form factor for ease of storage and transportation. It is this objective to which the present invention is directed.

According to a first embodiment of the present disclosure, a box kite is presented, the box kite comprising: a single piece canopy comprising two sails, each closed in a loop, and connected via tubular sleeves attached at respective first edges of the two sails; and a demountable frame comprising a plurality of spars, a plurality of struts, and sockets and plugs configured for interconnection of the plurality of spars with the plurality of struts, wherein in an assembled state of the box kite: each spar of the plurality of spars is fitted, at a medial region of the each spar, within a respective one of the plurality of tubular sleeves, and confined at a respective first end and second end of the each spar, into respective pockets at respective second edges of the two sails, and struts of the plurality of struts extend between respective pairs of spars at regions of the spars in contact with the two sails.

According to a second embodiment of the present disclosure, a method for making a box kite is presented, the method comprising: constructing a single piece canopy comprising two sails, each closed in a loop, and connected via tubular sleeves attached at respective first edges of the two sails; providing a demountable frame comprising a plurality of spars, a plurality of struts, and sockets and plugs configured for interconnection of the plurality of spars with the plurality of struts, assembling the box kite using the following steps: sliding each spar of the plurality of spars through a respective tubular sleeve of the canopy, thereby covering a medial region of the each spar with a respective tubular sleeve; inserting a respective first end and second end of the each spar into respective pockets at respective second edges of the two sails, and extending struts of the plurality of struts between respective pairs of spars at regions of the spars in contact with the two sails.

The features and advantages of the invention will be more readily understood from the following detailed description which should be read in conjunction with the accompanying drawings.

BRIEF DESCRIPTION OF THE DRAWINGS

The accompanying drawings, which are incorporated into and constitute a part of this specification, illustrate one or more embodiments of the present disclosure and, together with the description of example embodiments, serve to explain the principles and implementations of the disclosure.

FIG. 2A is a top view, in enlarged scale, of the box kite shown in FIG. 1.

FIG. 2B is a top view, in enlarged scale, of an alternative embodiment of the box kite shown in FIG. 1 where the spreader struts are not fitted with the plugs.

FIGS. 3A and 3B are detailed top views, in enlarged scale and partially in section, of a socket and plug combination according to an embodiment of the present disclosure, incorporated in the box kite shown in FIG. 1.

FIGS. 5 and 6 are detailed views, of an inside of the sail shown in FIG. 4A during assembly steps of the box kite shown in FIG. 1, where a spar is inserted in a fabric sleeve that is stitched to the sail.

FIGS. 7 and 8 are detailed views similar to FIGS. 5 and 6 of an inside of the sail shown in FIG. 4A during assembly steps of the box kite shown in FIG. 1, showing a socket and a cap, respectively, being inserted on a spar.

DETAILED DESCRIPTION OF THE PREFERRED EMBODIMENTS

The box kite of the present invention includes a supple, pliable single piece canopy having a pair of sails connected via sleeves, and a demountable frame that includes a plurality of spars and a plurality of struts interconnected via a combination of sockets in friction or interference connection with the plurality of spars, and plugs that cap the plurality of struts. Each of the pair of sails include fabric pockets and fabric loops aligned at opposite edges of the sail that are configured to define corners of a quadrangular configuration of the sails in an assembled state of the box kite. The sleeves, generally fabric sleeves, connect the two sails, generally fabric sails, via connection of ends of the sleeves to the fabric loops.

In the assembled state of the box kite of the present invention, the pair of sails are maintained in a drum-tight fashion to form the quadrangular configuration via a) fitting of a respective one of the plurality of spars between corresponding fabric pockets of the first and second sails, and through a respective sleeve, and b) projecting at least one strut of the plurality of struts between pairs of spars via interconnections provided by the combination of sockets and plugs. Accordingly, the plurality of spars project between the sails and through respective sleeves, with respective opposite extremities of the spars received in respective pockets of the sails, and the struts projecting between pairs of spars to provide the drum-tight configuration of the sails.

In the assembled state of the box kite of the present invention, the plurality of spars are spaced apart and coextensive, formed at their opposite extremities with spar extensions arranged in respective corners of the quadrangular (e.g. box) sails. The sockets are formed on respective one ends with rings that are slid over the spar extensions and configured with respective projecting barrels having bores which receive the extremities of respective struts in friction or interference fit to provide for convenient and effective construction of the box kite. The extremities of the respective struts may be capped with closed hollow cylindrical plugs with end walls configured to be in coaxial relationship with the respective projecting barrels of the sockets. Capping of the extremities of the respective struts with the plugs can provide not only ease of assembly and disassembly of the box kite, but also added safety in the handling of the struts which may include (unfinished) sharp and/or irregular extremities. Accordingly, preparation of the struts may include a single step of cutting to a desired length without further processing.

Figure 1A:
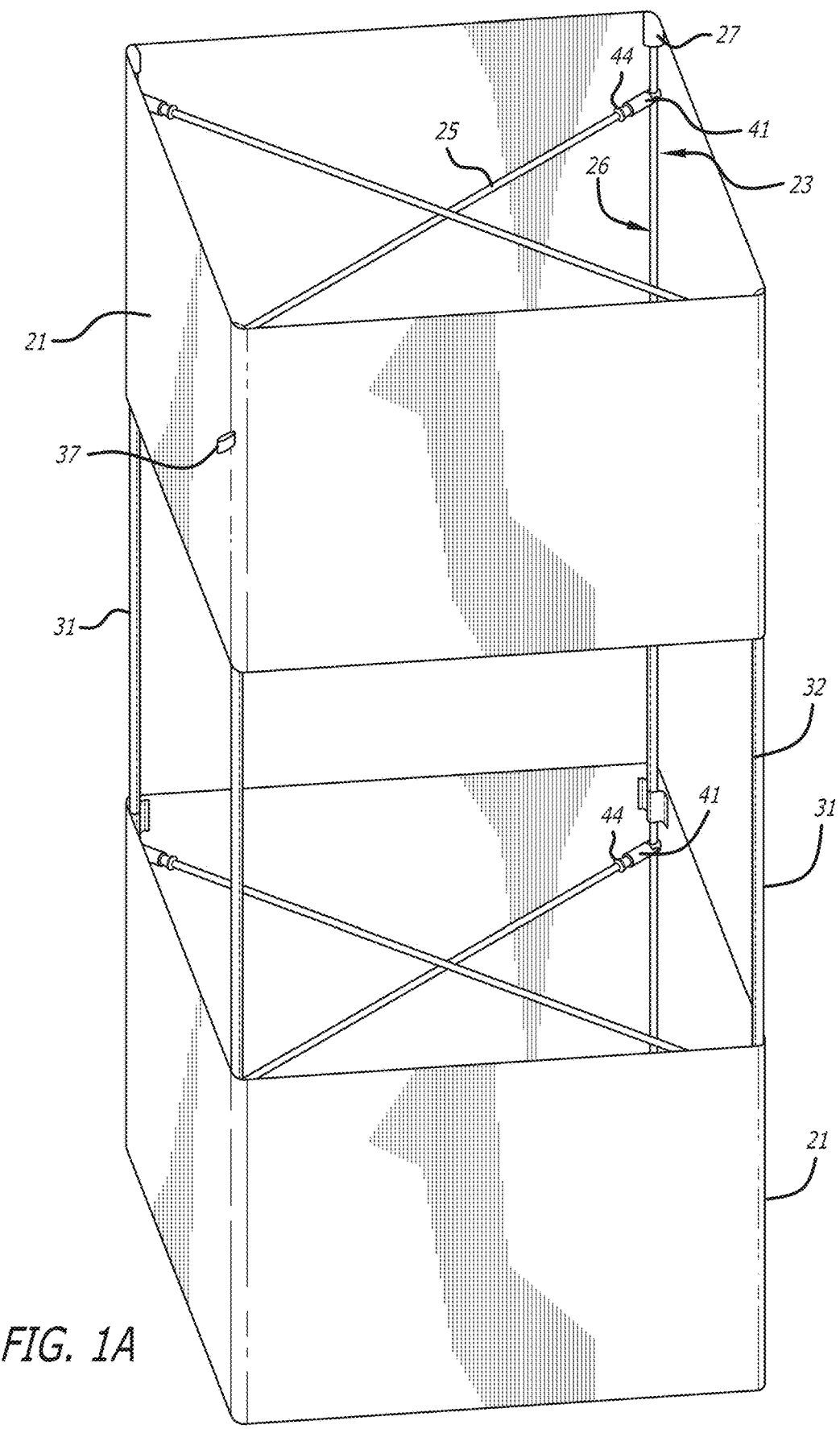
FIG. 1A is a perspective view of a box kite according to an embodiment of the present invention in an assembled state, the box kite comprising a canopy fitted on a demountable frame.

FIG. 1A is a perspective view of a box kite according to an embodiment of the present invention in an assembled state of the box kite. As can be seen in FIG. 1A, the box kite of the present invention includes, generally, a plurality of elongated spars 23, spaced about in a quadrangular pattern with the distal spar extensions 26 thereof received in respective inside corners of sails 21 and pushed apart to provide, in combination, rigidity for the sails 21 and tight (e.g. drum-tight) sail fabric which results in a box-like (quadrangular) shape of the sails 21. The spar extensions 26 are conveniently received at their opposite ends in fabric pockets 27 formed at distal ends of the inside corners of the sails 21, and project medially through fabric sleeves 31 connecting between the opposed sails (top and bottom sails 21). Sockets, generally designated 41, are formed at one extremity with rings 43 (e.g. FIG. 1D) received in friction or interference fit relationship over respective spar extensions 26 of the spars 23, and are formed with barrels 42 (e.g. FIG. 1D) receiving the opposite ends of respective spreader struts 25, capped with plugs 44, which serve to hold opposed spars 23 in spaced apart relationship.

With continued reference to FIG. 1A, sewn on to one corner of one of the sails 21 (e.g. a top sail 21) is a fabric loop defining a tow tab 37 of the box kite according to the present disclosure. By virtue of being sewn on to the sail 21, therefore part of the canopy (30 of FIG. 1B), the tow tab 37 is independent of the frame of the box kite. According to an embodiment of the present disclosure, the tow tab 37 provides the only tethering connection to the box kite. Such tow tab may therefore provide for a quick connection and disconnection of a towing string (not shown). A person skilled in the art would appreciate the single tow tab 37 configuration of the box kite according to the present disclosure, which can allow, for example, ease of assembly and disassembly of the box kite. A preferred position of the tow tab 37 along a corner (e.g. any corner) of the top sail 21 has been determined, via extensive in-flight testing of the box kite, to be in the top half of the top sail 21, which position provides an optimal take off (attack) angle of the kite as well as quasi perfect in-flight balancing of the kite, According to a preferred embodiment of the present disclosure, the tow tab 37 is positioned at a distance from the top edge of the sail 21 that is in a range of 30% to 40% of a longitudinal length of the sail 21 (along a direction of the spars 23).

With further reference to FIG. 1A, the spars 23 may be of lightweight tubular construction, preferably of plastic, fiberglass, carbon fiber, or the like. Other light material, such as light metals comprising, for example, aluminum, zinc, magnesium and titanium, may also be used in the construction of the spars 23. The struts 25 are of similar construction. The spars 23 and/or the struts 25 may be constructed to be either flexible or rigid without affecting ability to assemble and disassemble of the box kite according to the present disclosure.

Figure 1B:
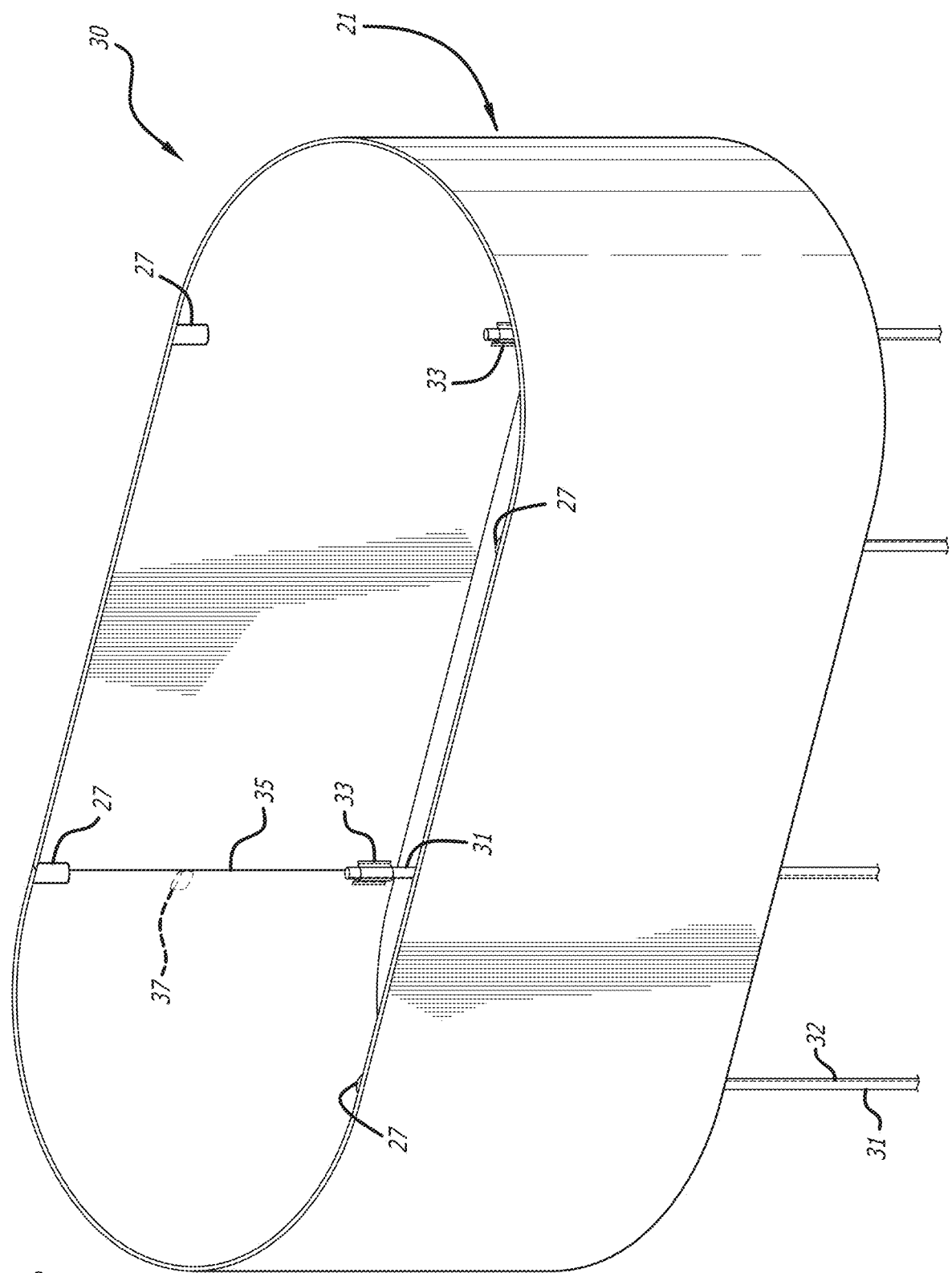
FIG. 1B is a perspective view of a top portion of the canopy, showing a top sail and sleeves that connect to a bottom sail.

FIG. 1B is a perspective view of a top portion of the canopy 30 of the box kite of the present disclosure, showing a top sail 21 and sleeves 31 that connect via fabric loops 33 to the top and bottom (not shown) sails 21. The sails 21 and sleeves 31 may be of a lightweight, supple, and durable fabric. According to an exemplary non-limiting embodiment of the present disclosure, such fabric may be constructed of crosshatch woven thread known in the trade as ripstop fabric. Ripstop fabrics may be woven fabrics, often made of nylon, using a special reinforcing technique that makes them resistant to tearing and ripping. During weaving, (thick) reinforcement threads are interwoven at regular intervals in a crosshatch pattern. A person skilled in the art may use other types of fabrics depending on design needs/goals, including, for example, cost, durability and expected flight conditions.

As can be seen in FIG. 1B, the sail 21 may be closed in a loop via at least one stitched seam 35 formed along a length of the sail 21. According to an embodiment of the present disclosure, the fabric loop defining the tow tab 37 may be sewn to the top sail 21 by way of stitches of the stitched seam 35 so to provide a solid connection to the sail 21. The bottom sail 21 (not shown) may be constructed in a similar fashion as one described for the top sail 21, except for the presence of the tow tab 37. It should be noted that in general, the top and bottom sails 21 are symmetrical in shape with only distinguishing feature being presence or not of the tow tab 37. A person skilled in the art would appreciate advantages provided by the single structure of the canopy 30 according to the present disclosure, such as, for example, simplicity of construction, assembly, and disassembly. Furthermore, due to its supple and pliable nature, the canopy 30 can be easily folded into a reduced space and placed/stored, along with other parts (e.g., frame) of the box kite, in a variety of packaging shapes, including substantially flat or substantially tubular shapes.

Figure 1C:
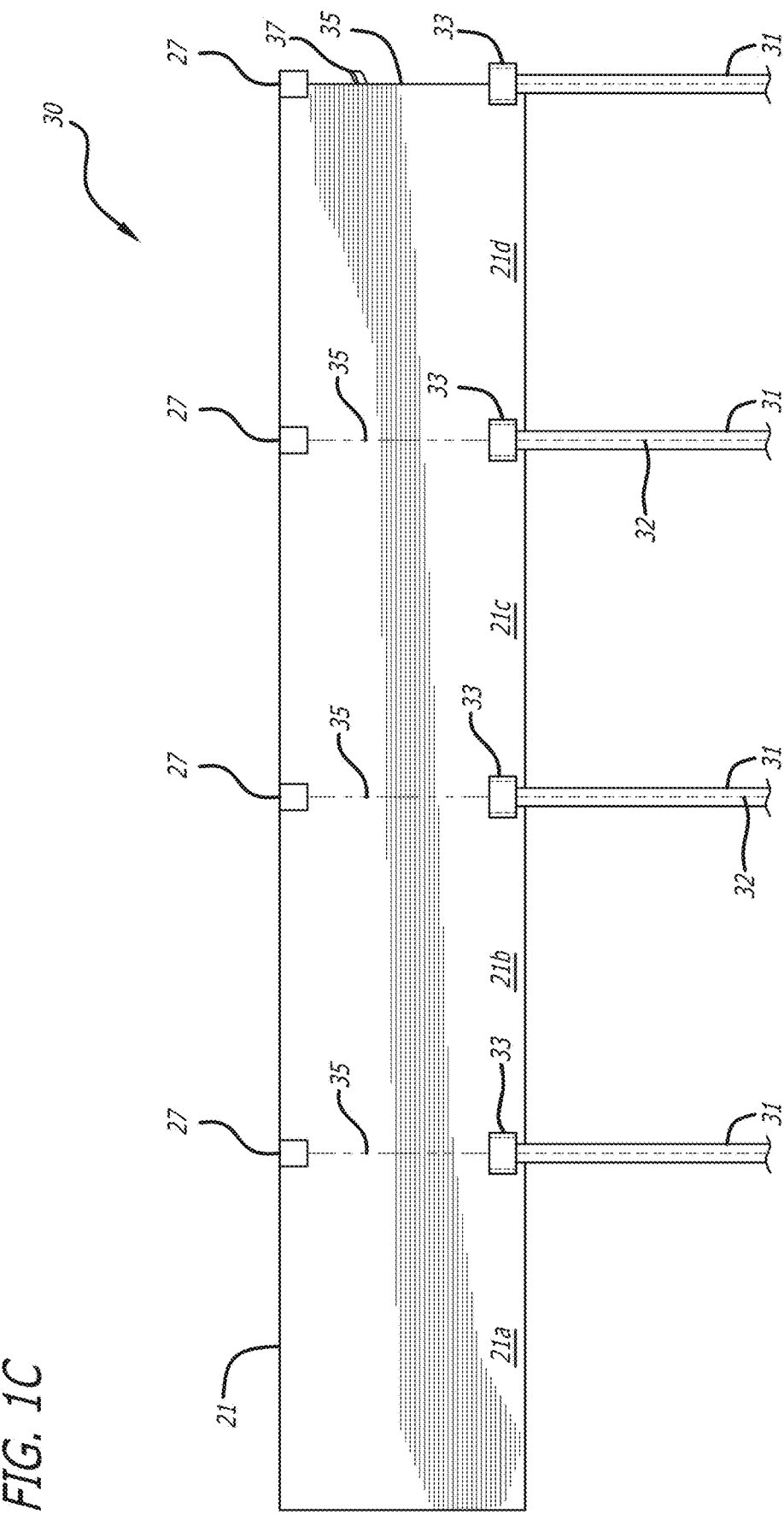
FIG. 1C is a plane view of a top portion of the canopy shown in a flattened state with the top sail not fully stitched.

FIG. 1C is a plane view of a top portion of the canopy 30 shown in a flattened open state with the top sail 21 not fully stitched. The plane view depicted in FIG. 1C shows the inner surface of the top sail 21. At the exception of the tow tab 37, the bottom sail 21 may be depicted by a similar (symmetrical) view. As can be seen in FIG. 1C, the top sail 21 may comprise fabric pockets 27 formed along the top edge of the sail 21, and fabric loops 33 formed along the bottom edge of the top sail 21 and aligned along the longitudinal direction of the sail 21 with the fabric pockets 27. Accordingly, each pair of fabric pocket 27 and fabric loop 33 formed at opposite edges of the sail 21 defines a corner of a quadrangular configuration of the sail 21 in its assembled state. A person skilled in the art would clearly understand that each such corner is effectively a line that joins two adjacent sides of the quadrangular configuration of the sail 21. Interaction between the supple, pliable canopy 30 and the demountable frame structure (e.g. FIG. 1D) in the assembled state of the box kite of the present disclosure, effectively creates the corners. As described above with reference to FIG. 1A, in the assembled state of the box kite according to the present disclosure, the spars extensions 26, portions of the spars 23, align with the lines that join two adjacent sides of the sail 21. I would be clear to a person skilled in the art, that the tow tab 37 being formed on an external surface of the top sail 21, in an assembled state of the box kite, as shown in FIG. 1A, the tow tab would not make direct (mechanical) contact with any part of the demountable frame, that is, the spars 23, struts 25, sockets 41 and plugs 44.

With continued reference to FIG. 1C, according to an embodiment of the present disclosure, the sail 21 may be constructed of a single patch of rectangular fabric that is closed in a loop along the stitched seam 35, as shown by the solid lines of FIG. 1C. According to an alternative embodiment of the present disclosure, the sail 21 may be constructed via a plurality (e.g., 2 or more) patches of fabric that are stitched to one another via a plurality of stitched seams. FIG. 1C shows, by way of a combination of solid and dotted lines, a non-limiting case where four patches of fabric (21a, 21b, 21c, 21d) are stitched to one another via three stitched seams 35 (shown in dotted lines in FIG. 1C). It should be noted that the tow tab 37 may be formed along any stitched seam 35 joining any two of the four patches or fabric (21a, 21b, 21c, 21d), and not necessarily along the stitched seam 35 joining fabric patches 21a and 21d. The tow tab being formed at a predetermined distance from the top edge of the sail 21, as discussed above.

With further reference to FIG. 1C, according to an embodiment of the present disclosure, the fabric loops 33 may be constructed by stitching or adhering fabric strips to cooperate in forming the fabric loops 33. In turn the sleeves 31 may be stitched to the fabric loops 33 at respective ends of the sleeves 31 so to join the top and bottom sails 21. According to another embodiment of the present disclosure, the fabric loops 33 may be formed by the ends of the sleeves 31 and without using of separate fabric strips.

With further reference to FIG. 1C, the fabric pockets 27 are aligned with the fabric loops 33 and formed at opposite edges of the sails 21. The fabric pockets 27 are closed at the edge sides of the sails and open at the opposite sides for the receipt of the respective opposite ends of the respective spar extensions 26. Similar to the fabric loops 33, the fabric pockets 27 may be formed via fabric strips that are adhered or stitched to the sails 21.

A person skilled in the art would clearly understand that a distance, in the assembled state of the box kite of the present disclosure, between respective (end walls of) fabric pockets 27 at opposite edges of the top and bottom sails 21, which is substantially the sum of the lengths of the top/bottom sails 21 (generally of a same length) and the length of sleeves 31, corresponds to a length of the spars 23, and widths of two adjacent sides of the quadrangular configuration of the sails 21 corresponds to a length of the struts 25. Accordingly, the sails 21 and sleeves 31 fabric may be cut to size, and the spars and struts may be cut to length, and all inventoried for subsequent assembly in what might be thought of as an assembly-line.

With further reference to FIG. 1C, according to an embodiment of the present disclosure, the fabric sleeves 31 extending between the top/bottom sails 21 may be constructed in a tubular shape by stitched seams 32 running lengthwise and open at the ends for projection of the respective spars 23 (e.g. FIG. 1A) to thereby capture the medial portions of the respective spars 23. The opposite ends of the respective sleeves 31 may incorporate the fabric loops 33 stitched to the sails.

Figure 1D:
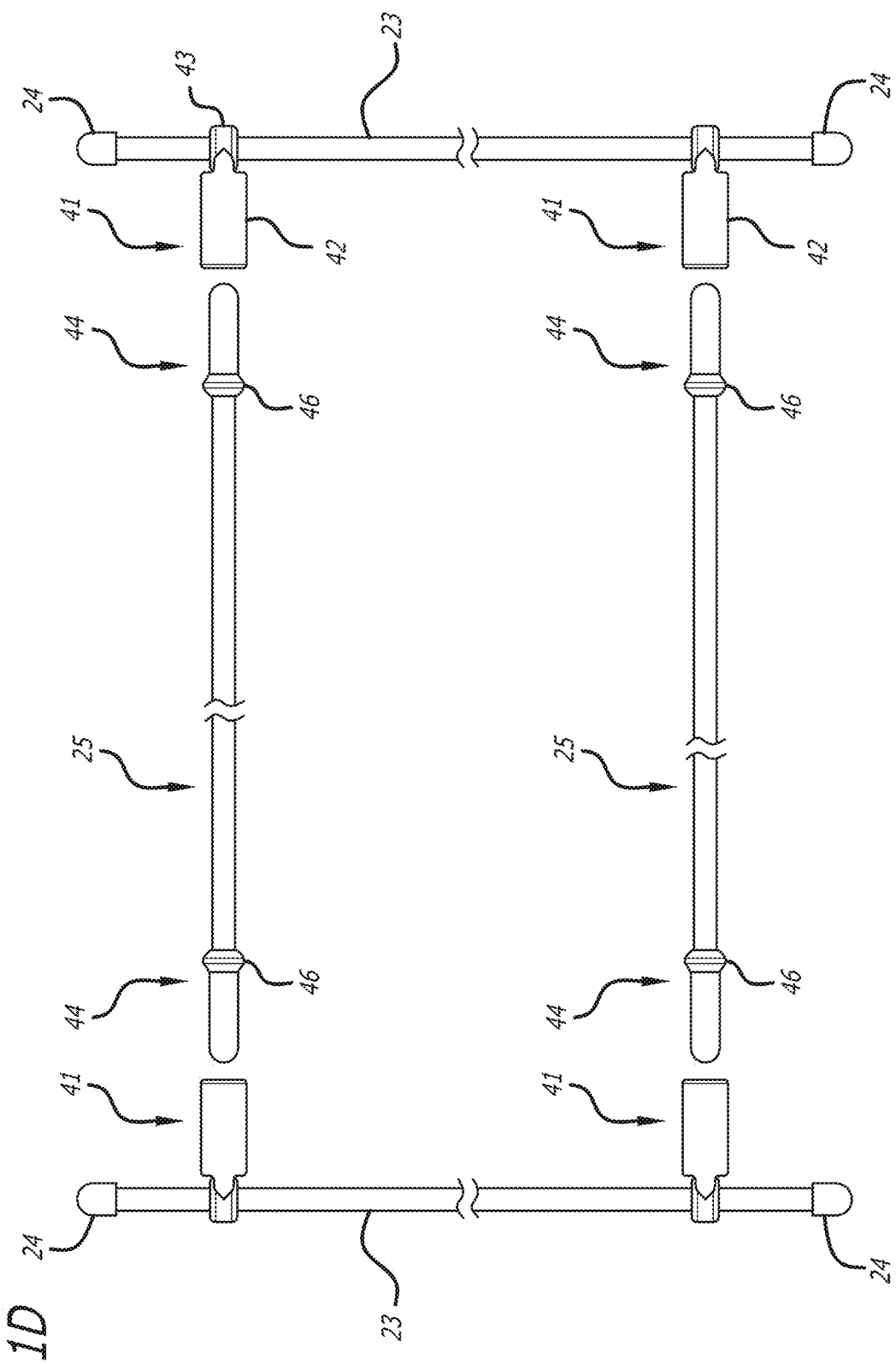
FIG. 1D shows details of elements of the demountable frame, including vertical spars fitted with sockets and spreader struts fitted with plugs.

FIG. 1D shows details of elements of the demountable frame of the box kite according to an embodiment of the present disclosure. As can be seen in FIG. 1D, such elements may include the (vertical) spars 23 configured to be fitted with sockets 41, and spreader struts 25 configured to be fitted with plugs 44. Cup-shaped cylindrical caps 24 can be used to cap ends of the spars 23. As the spars 23 may include (unfinished) sharp and/or irregular ends, the caps 24 may provide added safety in the handling of the spars 23 as well as protection of the canopy 30 (e.g. fabric pockets 27) from such ends.

With continued reference to FIG. 1D, each socket 41 may comprise a ring 43 portion configured with an (eye) opening for (friction) sliding along a spar 23, and a barrel 42 portion for receiving a spreader strut 25 fitted with the plug 44. An axial direction of the ring 43 may be substantially orthogonal to an axial direction of the barrel 42. Each plug 44 may comprise a hollow cylindrical structure that is closed at one end and opened at an opposite end to receive the strut 25. The open end of the plug 44 may be formed in a shape of a lip 46 for convenient grasping for exertion of force during assembly/disassembly of the box kite. According to a preferred embodiment of the present disclosure, the sockets 41 and plugs 44 may respectively be formed by molding of a polymer material, fiberglass or carbon fiber, so to provide for a sturdy and light-weight socket/plug connection capable of carrying relatively heavy loads without adding substantially to the overall weight of the box kite. More details of respective structures of the sockets 41 and plugs 44, as well as interaction to one another, can be found in FIGS. 3A and 3B described below.

FIG. 2A is a top view, in enlarged scale, of the box kite shown in FIG. 1, where it is shown that two crossing spreader struts 25, fitted with plugs 44 at their respective extremities, are each coupled to diagonally opposed spars 23 via the sockets 41. FIG. 2B shows an alternative configuration where the crossing spreader struts 25 are directly fitted to the sockets 41 of diagonally opposed spars 23 without usage of plugs 44. As mentioned above, the plugs may provide advantages in safety and handling of the struts 25 during assembly/disassembly of the box kite.

FIG. 3A shows further details of the top view of the box kite, in enlarged scale and partially in section to show relative placement of the spar 23 with respect to the pocket 27 and with respect to the ring 43 portion of the socket 41. As can be seen in FIG. 3A, an extremity of the spar 23 is entrapped by the pocket 27, and the ring 43 portion of the socket 41 is slid over the spar 23. Also, the plug 44 is fully positioned inside the barrel 42 of the socket 41, at the exception of the lip 46 of the plug 44. A person skilled in the art would understand that force applied by the spreaders 25 against the spars 23, and confinement of the spars 23 through their relative placements within the top/bottom sails 21 set by the sleeves 31 and pockets 27 of the canopy, create a substantially rigid quadrangular configuration of the sails 21 of the box kite.

FIG. 3B shows further details of the top view of the box kite, in enlarged scale and partially in section to show relative placement of the spar 23 with respect to the pocket 27, and with respect to the ring 43 portion of the socket 41, as shown in FIG. 3A, with additional details of the relative placement of the plug 44 with respect to the socket 41. As can be seen in FIG. 3B, the spreader 25, the closed hollow cylindrical portion of the plug 44, and the barrel 42 portion of the socket 41 are in coaxial relationship with one another. An extremity of the spreader 25 is pushed against an end wall of the closed hollow cylindrical structure of the plug 44, while latter end wall is pushed against and end wall of the barrel 42 portion of the socket 41.

Figure 4A:
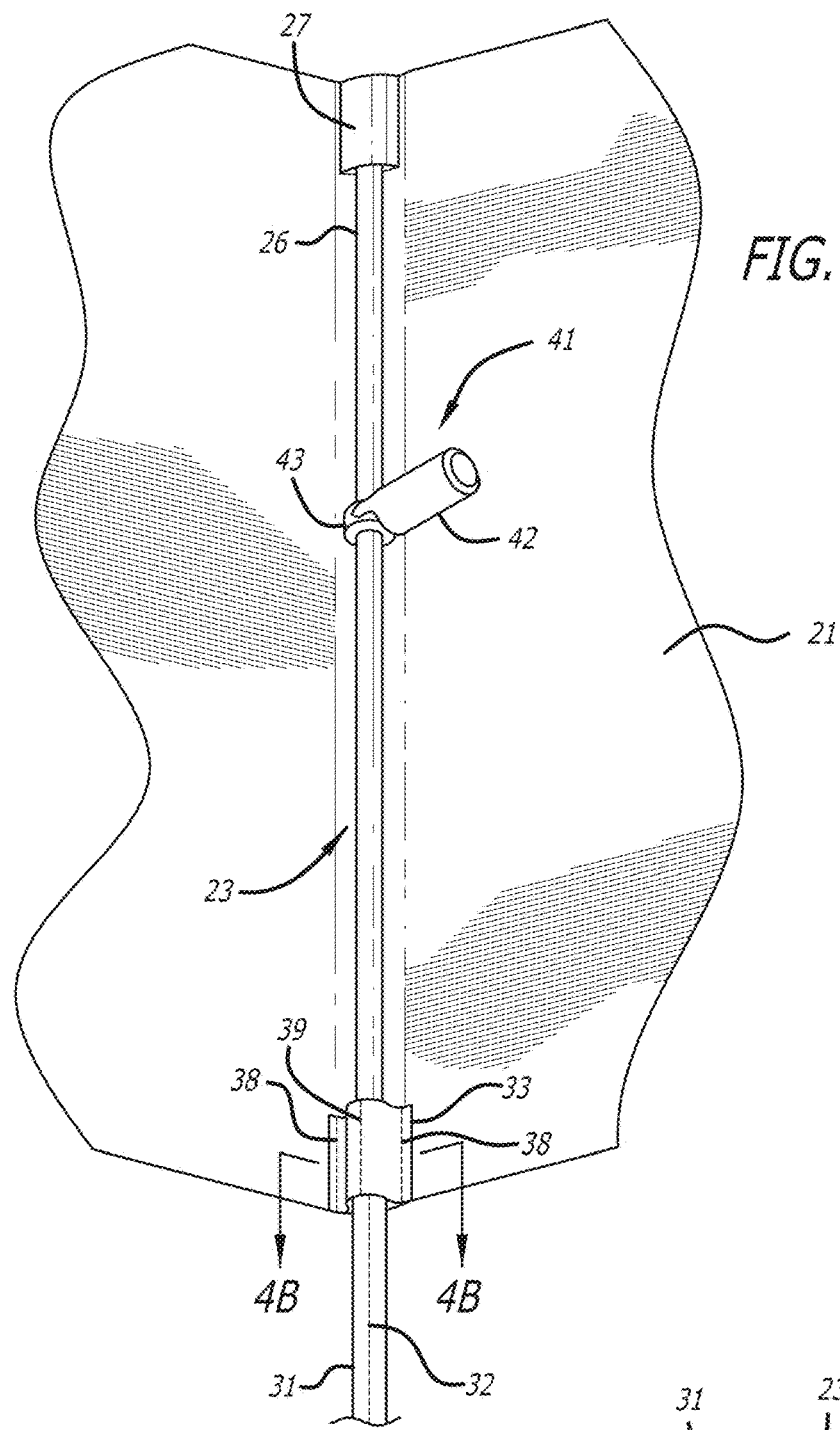
FIG. 4A is a perspective view, in enlarged scale, of an inner surface of a sail incorporated in the box kite shown in FIG. 1 prior to mounting the spreader struts.

FIG. 4A is a perspective view, in enlarged scale, of an inner surface of the sail 21 incorporated in the box kite shown in FIG. 1 prior to mounting the spreader struts 25 to the frame of the box kite via the sockets 41. As can be seen in FIG. 4A, one end of the spar 43 is positioned into the fabric pocket 27 at an outer edger of the sail 21, and the spar 43 is fed through (e.g. telescoped) the sleeve 31 formed at an opposite edge of the sail 21. The socket 41 is slid, via the opening of the ring 43 section of the socket 41, over the spar 23, to make a friction connection with the spar 23. As can be seen in FIG. 4A, a section of the spar 23 between the pocket 27 and the sleeve 31, also referred to herein as a spar extension 26, remains exposed and in contact against the inner surface of the sail 21. Similarly, but not shown in FIG. 4A, the spar 23 extending through the sleeve 31 and into a bottom sail 21, is positioned at an opposite end of the spar 23, into a fabric pocket 27 of the bottom sail 21, and thereby also exposing a bottom spar extension 26. The spar extensions 26 are therefore regions of the spar 23 that make contact with the inner surface of the sails 21, and within which regions the sockets 41 are free to be slidably positioned by way of the ring 43 regions of the sockets 41.

Figure 4B:
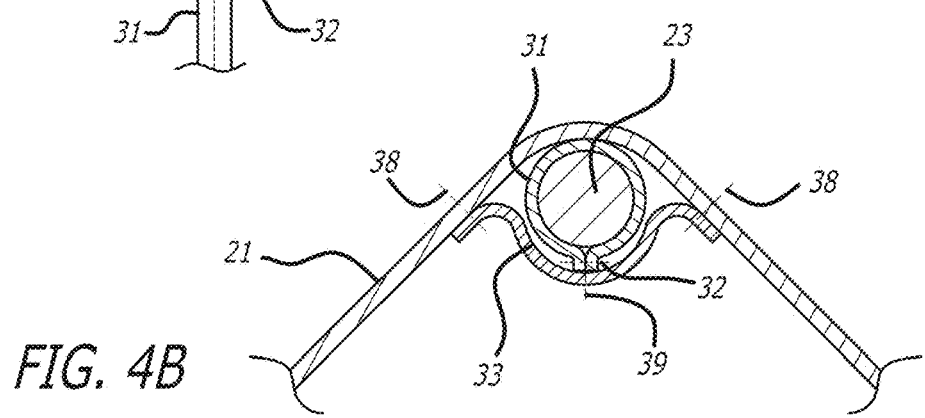
FIG. 4B is a detailed top view, in enlarged scale and partially in section according to reference shown in FIG. 4A, of a fabric loop and fabric sleeve incorporated in the box kite shown in FIG. 1.

FIG. 4B is a detailed top view, in enlarged scale and partially in section according to the reference 4B shown in FIG. 4A, of the fabric loop 33 and the fabric sleeve 31 incorporated in the box kite shown in FIG. 1. According to an embodiment of the present disclosure, the fabric loop 33 is stitched to the sail 21 by way of stitched seams 38, and the fabric sleeve 31 is in turn positioned inside the fabric loop 33 and stitched to the fabric loop 33 by way of a stitched seam 39. A person skilled in the art would realize that such connection of the fabric sleeve 31 to the sail 21 via an intermediary means, namely the fabric loop 33, may not be considered as limiting the scope of the present disclosure, as other connections, using more or less stitched seams, and/or more or less intermediary means, may be envisioned. As noted above, according to an alternate embodiment of the present disclosure, the fabric sleeve 31 may be directly stitched to the sail 21 using, for example, a stitched seam positioned at a diametrically opposite region, with respect to the fabric sleeve 31, of the stitched seam 39 shown in FIG. 4B.

FIGS. 5-13 show different steps in the assembly process of the box kite according to the present disclosure, whose assembled state is shown in FIG. 1 discussed above. As noted above, the box kite of the present disclosure comprises a supple, pliable, single piece canopy 30, and a demountable frame comprising spars 23, spreader struts 25, sockets 41 and plugs 44, whose interaction creates a quadrangular structure comprising a substantially rigid frame and two opposing box-like sails 21 that are maintained in drum-tight fashion via forces created by the interaction. A person skilled in the art would clearly understand and perform a reverse ordering of such steps for a disassembly of the box kite.

During assembly of the box kite of the present disclosure, the top/bottom sails 21 are formed in the rectangular box-like configuration and restrained from separation via the sleeves 31 that connect the two sails 21. As shown in FIGS. 5-7, the spars 23 may be telescoped through the sleeves 31 to leave the spar extensions 26 freely projecting into the confines of the respective sails 21 while remaining unattached from the fabric of the sails 21 throughout their medial lengths. As shown in FIG. 7, the rings 43 of sockets 41 may then be telescoped over the free ends of the spars 23, and, as shown in FIG. 8, slid medially through the respective spar extensions 26. Cap ends 24 can be used to cap the ends of the spars 23 as shown in FIG. 8, and the free ends of the spars 23 tucked into the respective pockets 27 as shown in FIG. 10.

Figure 10:
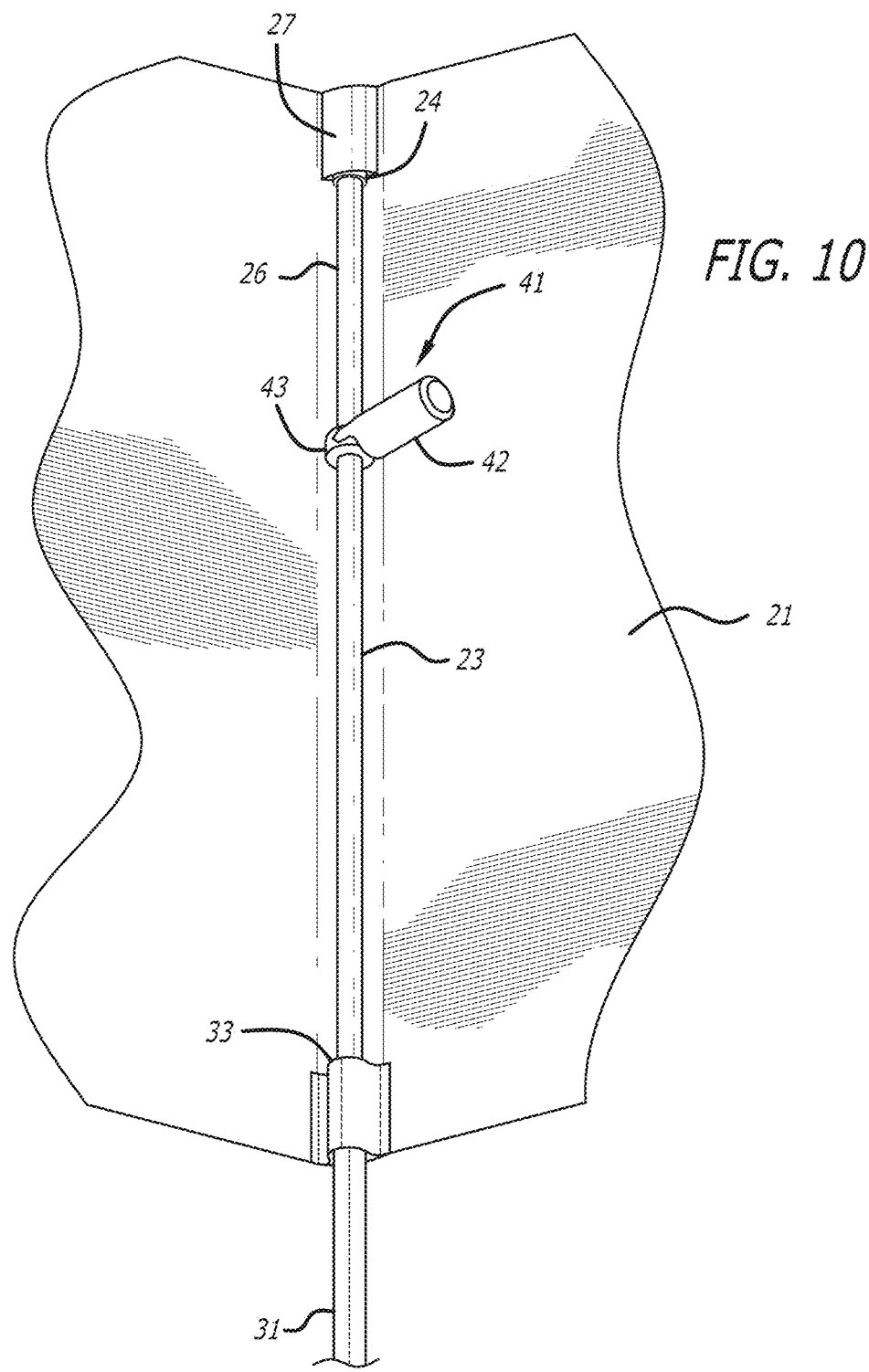

As the spars 23 are cut to a length corresponding with the distance between the end walls of corresponding pockets 27, during assembly, they may be flexed into a slight bow to tuck the ends of the spars 23 in the respective pockets 27 and, when released, the spars 23 may flex straight to abut the opposite ends thereof against the end walls of the respective pockets 27 to hold the canopy 30, including the sails 21 and sleeves 31, taut (stretched) in the longitudinal direction, as shown in, for example, FIG. 10.

Figure 9:
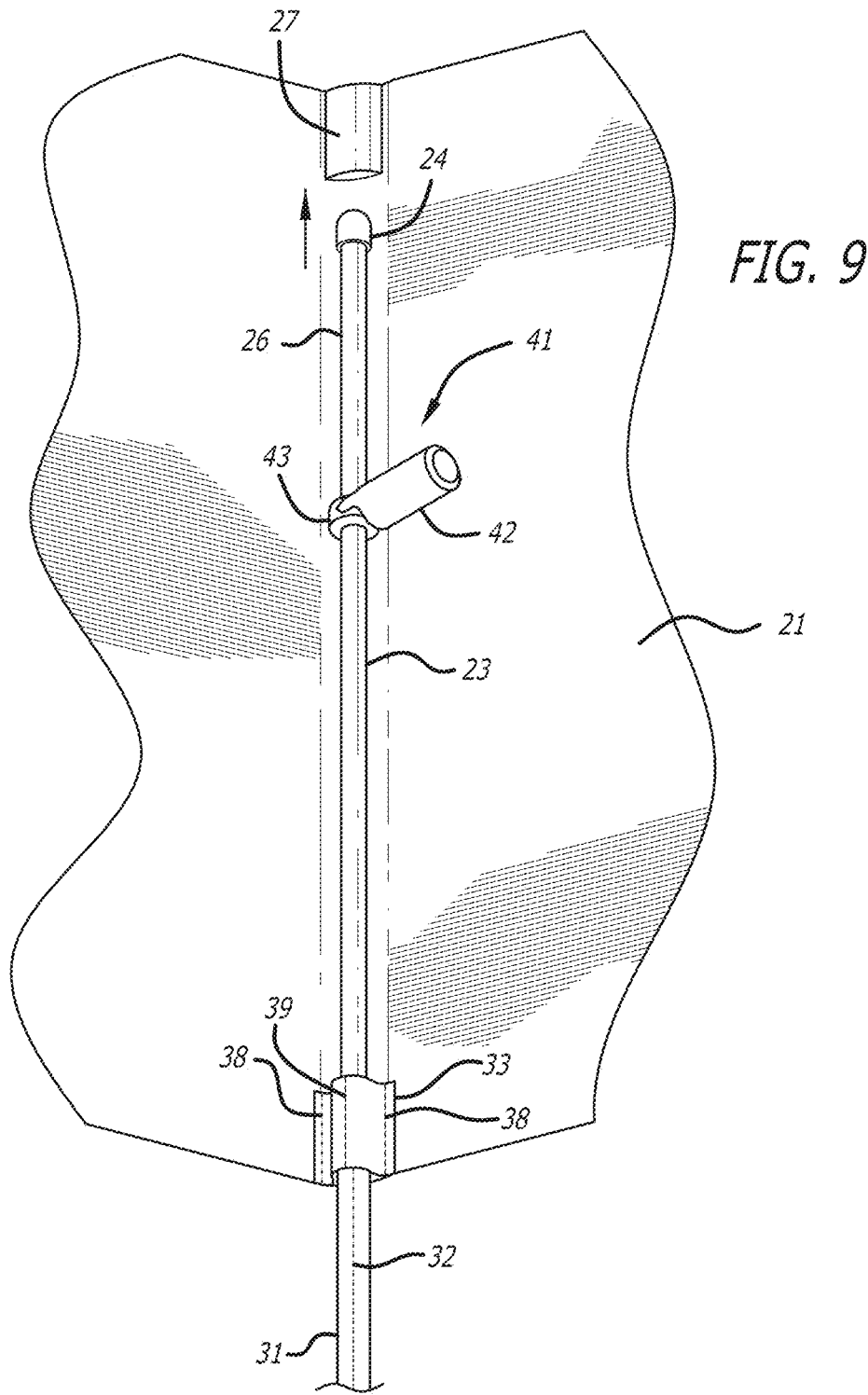
FIGS. 9 and 10 are detailed views similar to FIGS. 7 and 8 of an inside of the sail shown in FIG. 4A during assembly steps of the box kite shown in FIG. 1, showing a spar being inserted into a pocket formed in the sail.

With further reference to FIGS. 5-13, during assembly, rings 43 of sockets 41 are slid in friction or interference fit over the ends of the individual spars (FIGS. 9 and 10) and slid longitudinally along the spar extensions 26 thereof to be adjusted to different longitudinal positions and be frictionally held in position. The extremities (ends) of the respective spars 23 may be capped by respective cup-shaped cylindrical caps 24 (FIG. 9) and the ends tucked into the open ends of the respective pockets 27 to abut the closed ends of such pockets to push the respective sails distally (FIGS. 9 and 10).

Figure 11:
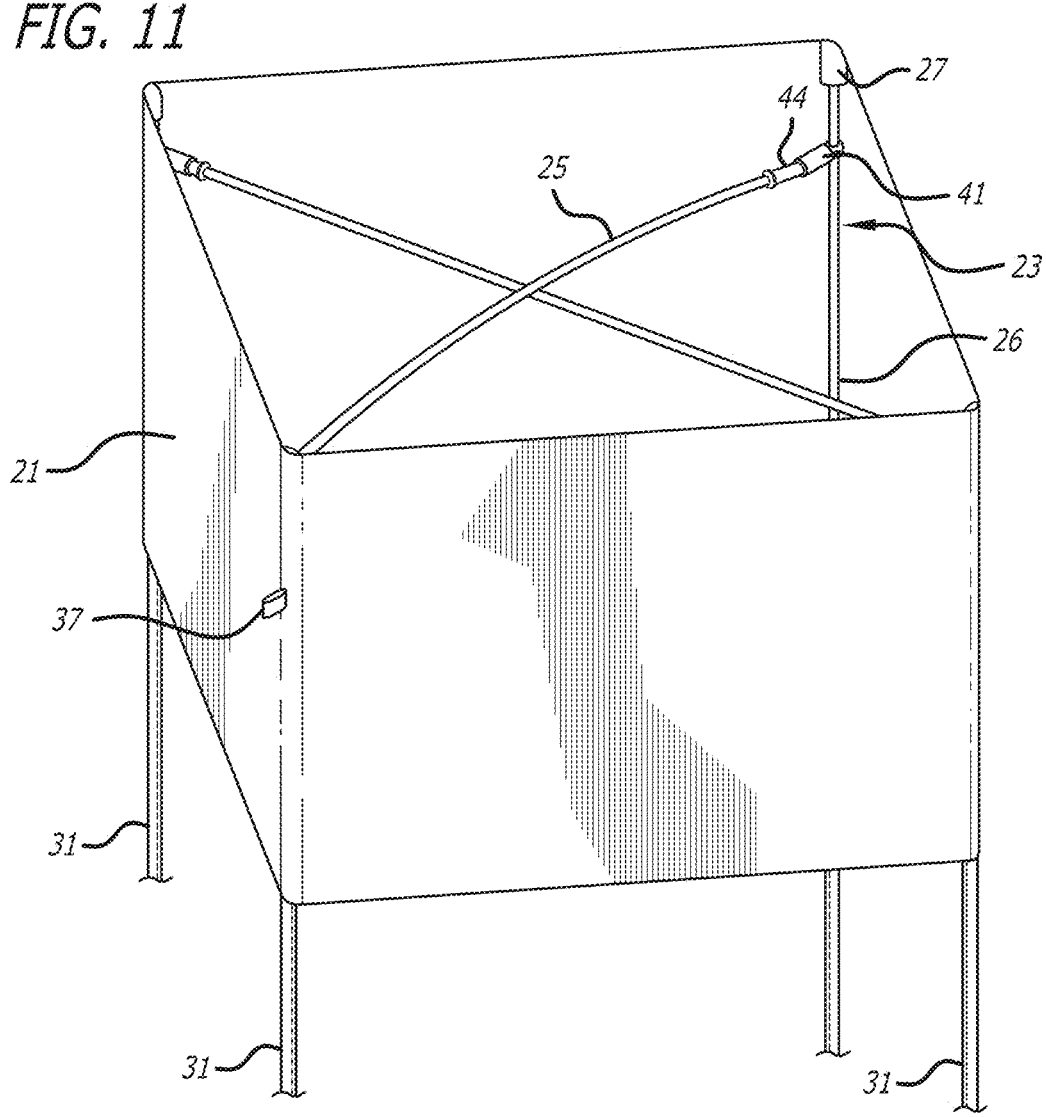
FIG. 11 is a perspective view of a top sail of the box kite shown in FIG. 1 during an assembly step of the box kite, showing a strut, fitted with a plug, being inserted in a socket fitted on a spar.

As shown in FIG. 11, according to a preferred embodiment of the present disclosure, the sockets 41 may be constructed with the barrels 42 sized to be close fit with the outer walls of the hollow cylindrical plugs 44 that cap the struts 25, so that in the assembled state of the box kite, respective ends of the struts 25, plugs 44 and barrels 42 of the sockets 41 are in coaxial relationship. Accordingly, the spars 23 being in coaxial relationship with the rings 43 portion of the sockets 41, in the assembled state of the box kite, the spars 23 and the struts 25 are arranged with respect to one another according to a substantially orthogonal relationship. As noted above with respect to the description of FIG. 2B, according to some embodiments of the present disclosure, the plugs 44 may be omitted, in which case the barrels 42 of the sockets 41 may be sized to be close fit with an outer diameter of the struts 25.

Figure 12:
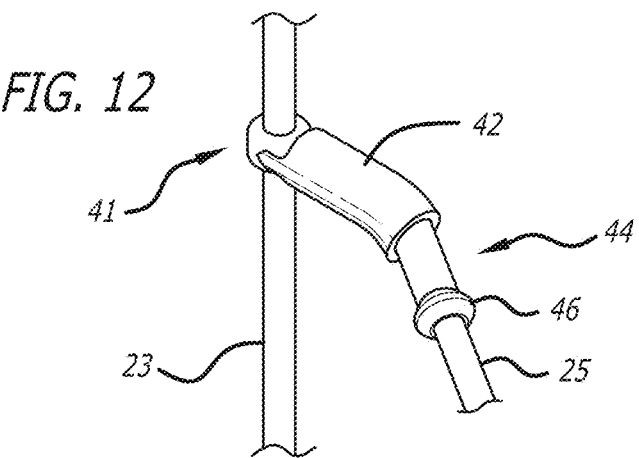
FIG. 12 is a detail perspective view, in enlarged scale, of an assembly step of the box kite, showing a socket on a spar receiving a plug on a strut as shown in FIG. 11.

As shown in FIG. 11, with sockets 41 in place, via corresponding rings 43, on respective diametrically opposed spars 23, a strut 25 may be added across such diametrically opposed spars 23, by, for example, first inserting one end of the strut 25 into a first one of the sockets 41, and then flexing the strut 25 into a slight bow so to insert the other end of the strut 25 into the other one of the sockets 41. A combination of the flexible nature of the socket 41, as shown in FIG. 12, and flexible nature of the strut 25, may allow for such addition of the strut 25.

Figure 13:
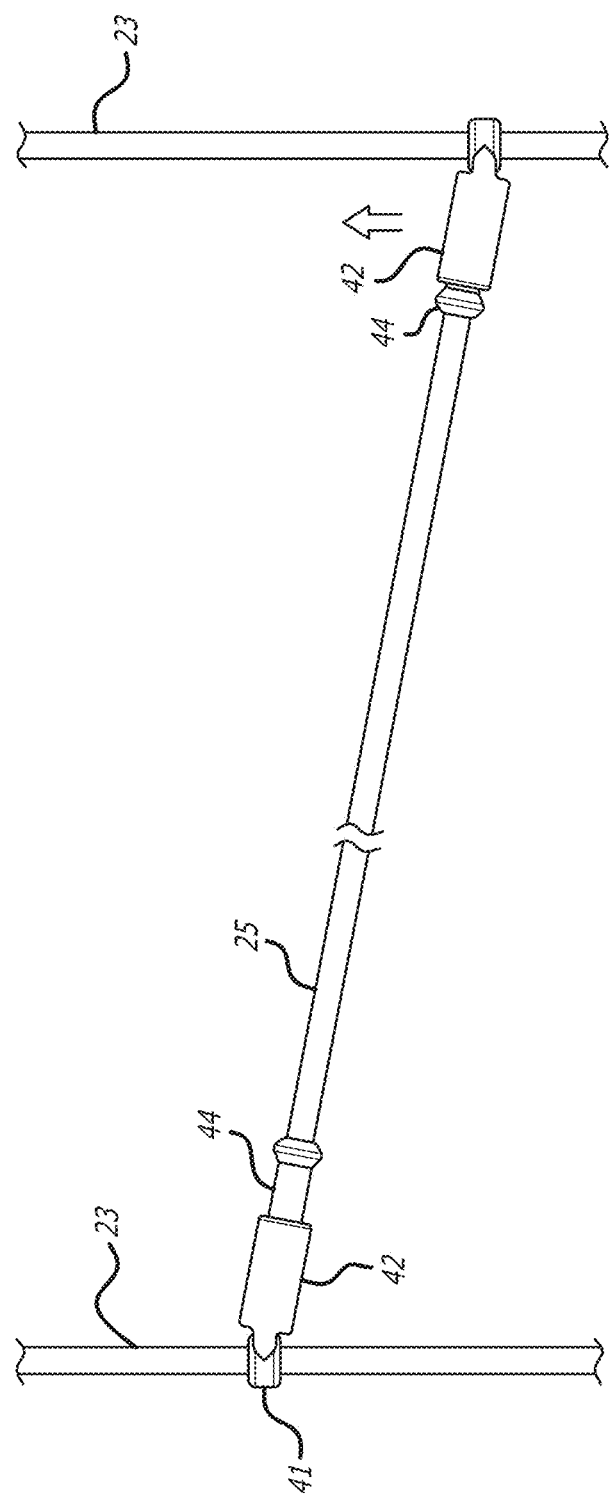
FIG. 13 is a view showing an alternative embodiment to the assembly step depicted in FIG. 12.

As a material used for fabrication of the struts 25 may not necessarily provide enough flexibility to allow bowing of the strut 25 as discussed above, FIG. 13 depicts an alternative, or additional, step for adding the strut 25 across diametrically opposed spars 23. As can be seen in FIG. 13, with the sockets 41 in place on the spars 23, the struts 25 may be added by increasing a relative distance between the two sockets 41 by shifting (longitudinally along the spars 23) a position of at least one of the two sockets 41 relative to a final assembly transverse plane that is substantially orthogonal to the spars 23 and includes both sockets 41. By increasing the distance between the two sockets 41, a first free end of the strut 25, and then a second free end of the strut 25, may be inserted in the respective flexible barrels 42 of the two sockets 41 without flexing of the strut 25. The sockets 41 may then be shifted into the same transverse plane as indicated by the arrow in FIG. 13. The struts 25 then serve to cooperate in spreading the respective diagonally positioned spars 23 apart to maintain the fabric of the sail 21 taut and maintained in a drum-tight fashion. As noted above, in some embodiments according to the present disclosure, the barrels 42 of the sockets 41 are constructed with some flexibility to facilitate assembly of the box kite according to the present disclosure with minimal or no flexing of the spreaders 25. According to an embodiment of the present disclosure, the barrel 42 may flex in the plane defined by and comprising the radial axis of the ring 43, which in the assembled position of the box kite, is the same axis as an axis defining the longitudinal direction of the spars 23.

Figure 14:
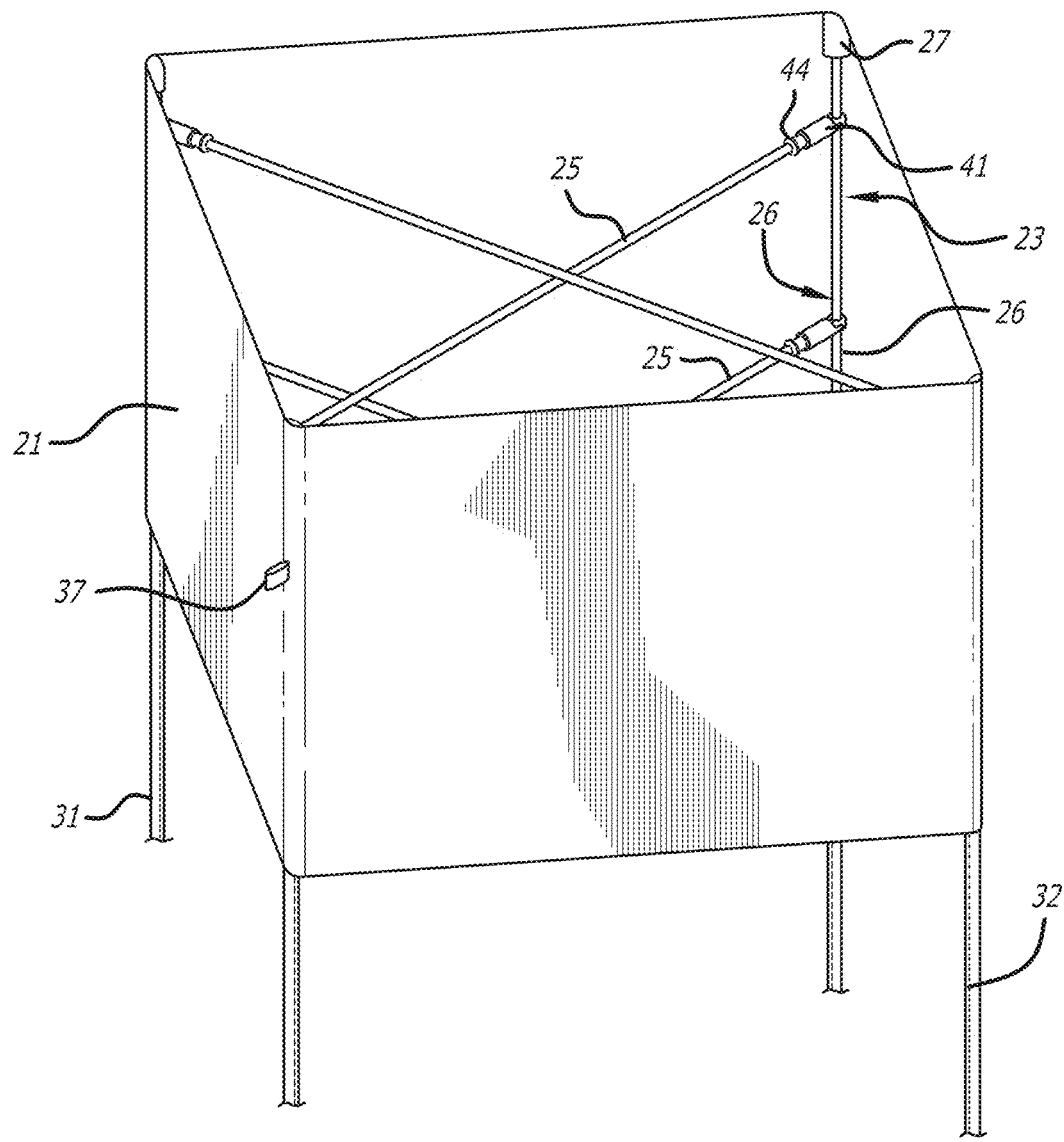
FIG. 14 is a perspective view of a top sail of the box kite shown in FIG. 1 according to a second embodiment of the present disclosure, where two pairs of spreader struts are used.

FIG. 14 is a perspective view of a top sail of the box kite shown in FIG. 1 according to a second embodiment of the present disclosure, where two sets (pairs) of spreader struts 25 are used in each sail 21. Provision of two or more sets of spars 25 may be incorporated in the box kite of the present disclosure to enhance a force applied by the spreader spars 25 to maintain the sails 21 hilly distended in drum-tight fashion for different (longitudinal) lengths of the sails 21, and under heavy wind loads. The additional set(s) of struts 25 in each sail 21 may also provide a more robust tensioning of the fabric of the sails 21 and enhance the overall lift and load capability of the box kite.

Figure 15:
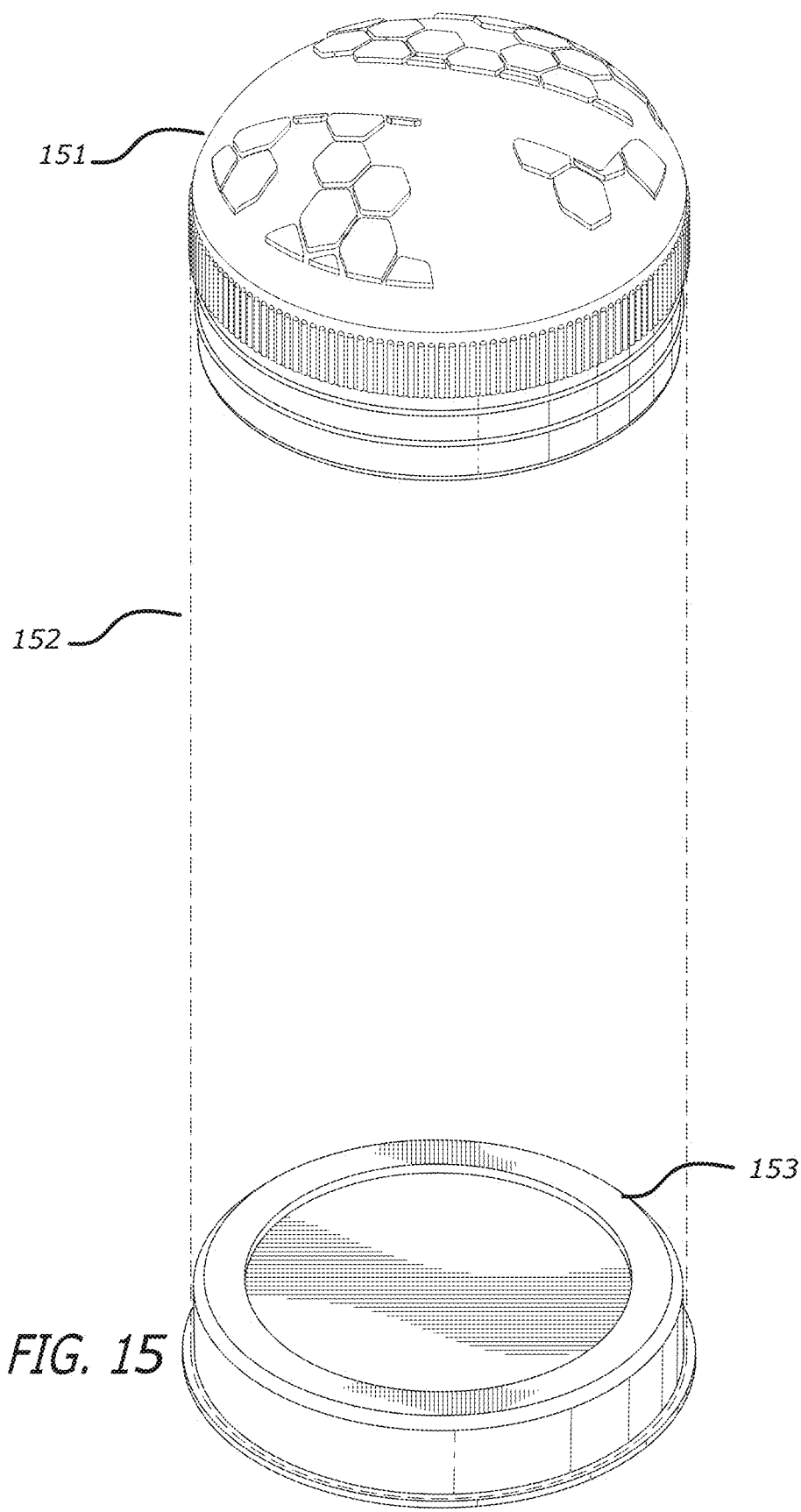
FIG. 15 is a perspective view of a packaging for the box kite according to the present disclosure.

FIG. 15 is a perspective view of an exemplary non-limiting packaging for the box kite according to the present disclosure. As can be seen in the figures, the packaging includes a substantially tubular body 152, a top cap 152, and a bottom cap 153. As discussed above, in the fully disassembled state of the box kite according to the present disclosure, the supple, pliable, single piece canopy 30 can be folded and/or rolled, and the demountable frame reduced to a number of substantially longitudinal elements (spars 23 and struts 25), which in combination, can be fit within the tubular body 152 of the packaging shown in FIG. 15. More details of such packaging can be found, for example, in the above referenced U.S. design application Ser. No. 29/628,168, whose disclosure is incorporated herein by reference in its entirety.

From the foregoing, it will be appreciated that the box kite according to the present disclosure, including the supple, pliable, single piece canopy 30 comprising opposite sails 21 connected via sleeves 31, and a demountable frame that includes spars 23 and struts 25 interconnected via sockets 41 and plugs 44 combination, is economical to manufacture, and may be assembled and disassembled safely and without the need of high-skilled workmen, and serves to provide a long and trouble-free performance. With only a minimal weight, the box kite of the present disclosure will provide extraordinary lift and can be scalable to different sizes while maintaining a single tow-point (i.e., tow tab 37) for tethering. By way of example, in practice, the box kite of the present disclosure, with sails 21 of about 18" in width and 13" in height each, weighs only 11 ounces, and provided lift equivalent to many times its weight in minimal wind conditions. A person skilled in the art will appreciate the wide wind speed range provided by the box kite according to the present teachings, where flying in very low winds to high winds is made possible. Accordingly, a flyer can fly the present box kite on more days of a year, whether in low winds or high winds.

The present invention may be embodied in other forms without departure from the spirit and essential characteristics thereof. The embodiments described therefore are to be considered in all respects as illustrative and not restrictive. Although the present invention has been described in terms of certain preferred embodiments, other embodiments that are apparent to those of ordinary skill in the art are also within the scope of the invention. Accordingly, the scope of the invention is intended to be defined only by reference to the appended claims.

The invention claimed is:

1. A box kite comprising:
   a single piece canopy comprising two sails, each closed in a loop, and connected via tubular sleeves attached at respective first edges of the two sails; and
   a demountable frame comprising a plurality of spars, a plurality of struts, and sockets and plugs configured for interconnection of the plurality of spars with the plurality of struts,
   wherein in an assembled state of the box kite:
   each spar of the plurality of spars is fitted, at a medial region of the each spar, within a respective one of the plurality of tubular sleeves, and confined at a respective first end and second end of the each spar, into respective pockets at respective second edges of the two sails, and
   struts of the plurality of struts extend between respective pairs of spars at regions of the spars in contact with the two sails.

2. The box kite of claim 1, wherein in the assembled state of the box kite, the each spar is arranged longitudinally through a respective tubular sleeve and in alignment with the respective pockets, so to define, for each sail of the two sails, a corner region where two sides of a quadrangular shape of the each sail meet.

3. The box kite of claim 1, wherein the single piece canopy comprises a tow tab attached at a top sail of the two sails for tethering of the box kite, the tow tab configured to not make direct mechanical contact with the demountable frame in the assembled state of the box kite.

4. The box kite of claim 3, wherein the tow tab comprises a fabric strip that is stitched at a region of the top sail closer to the second edge of the top sail.

5. The box kite of claim 4, wherein the fabric strip of the tow tab is stitched at a region of the top sail positioned at a distance from the second edge of the top sail that is in a range of 30% to 40% of a longitudinal length of the top sail.

6. The box kite of claim 4, wherein the fabric strip is stitched along a same stitched seam used for stitching the top sail into the closed loop.

7. The box kite of claim 4, wherein the single piece canopy comprises fabric constructed of crosshatch woven threads.

8. The box kite of claim 1, wherein each socket of the plurality of sockets comprises:
   i) a longitudinal barrel having a respective barrel axis, and constructed with a bore for receiving an extremity of a strut of the plurality of struts, and
   ii) a ring with a substantially circular opening having a respective axis that is orthogonal to the barrel axis, and constructed for friction fit over a spar of the plurality of spars.

9. The box kite of claim 8, wherein:
   each plug of the plurality of plugs is a cylindrical plug configured to be received in the bore of a respective barrel and configured to be fitted to an extremity of a strut of the plurality of struts, and
   in the assembled state of the box kite, each strut of the plurality of struts is fitted, at respective extremities, with respective plugs.

10. The box kite of claim 9, wherein each of the socket and the plug is a single piece molded part.

11. The box kite of claim 10, wherein the socket is molded from a flexible material.

12. The box kite of claim 1, wherein each sleeve of the tubular sleeves is made of an elongated fabric piece that is stitched along a corresponding stitched seam.

13. The box kite of claim 1, wherein each sleeve of the tubular sleeves is attached at the respective first edges via stitching of respective ends of the each sleeve to fabric loops stitched at respective two locations of the respective first edges.

14. The box kite of claim 1, wherein the single piece canopy comprises four tubular sleeves and the demountable frame comprises four spars.

15. The box kite of claim 14, wherein the demountable frame comprises at least four struts configured to be arranged as pairs of crossing struts, each pair extending between respective different pairs of spars at the regions of the spars in contact with the two sails.

16. A method for making a box kite, the method comprising:
   constructing a single piece canopy comprising two sails, each closed in a loop, and connected via tubular sleeves attached at respective first edges of the two sails;
   providing a demountable frame comprising a plurality of spars, a plurality of struts, and sockets and plugs configured for interconnection of the plurality of spars with the plurality of struts,
   assembling the box kite using the following steps:
   sliding each spar of the plurality of spars through a respective tubular sleeve of the canopy, thereby covering a medial region of the each spar with a respective tubular sleeve;
   inserting a respective first end and second end of the each spar into respective pockets at respective second edges of the two sails, and
   extending struts of the plurality of struts between respective pairs of spars at regions of the spars in contact with the two sails.

17. The method for making the box kite according to claim 16, wherein the constructing of the single piece canopy comprises:
   providing first and second fabric patches defining respective first edge and second edge opposite the first edge, and inner surface and outer surface, of the two sails;
   forming, on respective inner surface, fabric pockets at locations of respective second edges of the first and second fabric patches, relative distance between the locations defining side dimensions of a quadrangular shape of the first and second sails in the assembled state of the box kite;
   forming the tubular sleeves;
   attaching respective ends of the tubular sleeves at locations of the respective first edges of the first and second fabric patches that are aligned with the formed fabric pockets; and
   stitching each of the first and second fabric patches so to form the first and second sails, each sail being closed in a loop.

18. The method for making the box kite according to claim 17, wherein the stitching of the first fabric patch includes stitching a separate fabric strip so to form a fabric loop accessible from the outer surface of the first sail, the fabric loop adapted for use as a single tow point for tethering of the box kite.

19. The method for making the box kite according to claim 17, wherein the constructing of the single piece canopy further comprises:

stitching of fabric strips at the locations of the respective first edges of the first and second fabric patches that are aligned with the formed fabric pockets so to form fabric loops; and stitching the respective ends of the tubular sleeves to the formed fabric loops.

20. The method for making the box kite according to claim 16, wherein the providing of the demountable frame comprises cutting the plurality of spars to a length substantially equal to a distance between end walls of two opposing pockets at respective second edges of the two sails.

21. The method for making the box kite according to claim 16, wherein the providing of the demountable frame comprises forming of the sockets, wherein each socket comprises:
   i) a longitudinal barrel having a respective barrel axis, and constructed with a bore for receiving an extremity of a strut of the plurality of struts, and
   ii) a ring with a substantially circular opening having a respective axis that is orthogonal to the barrel axis, and constructed for friction fit Over a spar of the plurality of spars.

22. The method for making the box kite according to claim 21, wherein the assembling of the box kite further comprises:

sliding over the each spar a socket via the ring of the socket;

fitting respective extremities of the struts with the plugs; and inserting the extremities of the struts fitted with the plugs into the bores formed inside the barrels of the sockets.

\* \* \* \* \*